United States Patent [19]

Adamek et al.

[11] 4,380,783

[45] Apr. 19, 1983

[54] FLEXIBLE DISK DRIVE

[75] Inventors: Manfred Adamek, Kirchen-Freusburg; Klaus Rinneburger, Wilnsdorf, both of Fed. Rep. of Germany

[73] Assignee: U.S. Philips Corporation, New York, N.Y.

[21] Appl. No.: 247,583

[22] Filed: Mar. 26, 1981

[51] Int. Cl.³ .......................... G11B 17/02; G11B 5/82
[52] U.S. Cl. ....................................... 360/99; 360/133
[58] Field of Search .................... 360/99, 97, 133, 135

[56] References Cited

U.S. PATENT DOCUMENTS

| | | | |
|---|---|---|---|
| 3,593,327 | 7/1971 | Shill | 360/97 |
| 3,815,150 | 6/1974 | Stoddard et al. | 360/99 |
| 3,940,793 | 2/1976 | Bleiman | 360/99 |
| 4,146,912 | 3/1979 | Kukreja | 360/99 |
| 4,205,355 | 5/1980 | Hamanaka et al. | 360/99 |
| 4,216,510 | 8/1980 | Manzke et al. | 360/97 |

Primary Examiner—Alfred H. Eddleman
Attorney, Agent, or Firm—Joseph P. Abate

[57] ABSTRACT

A disc drive for a flexible magnetic disc includes a frame, a pivoted cover, a turntable spaced from a spindle-mounted disc clamping cone, and a lever for cooperating with the cone to move it toward and away from the turntable. The lever is mounted on the frame about a pivoting axis. As the cover is closed, a cover mounted roller contacts the lever at a point spaced a distance from the lever pivoting axis. This distance continuously increases until the disc is clamped for operation.

The stationary members for the spindle and the turntable are a unitary part with the frame. The members are machined to their final dimensions in one operation.

10 Claims, 4 Drawing Figures

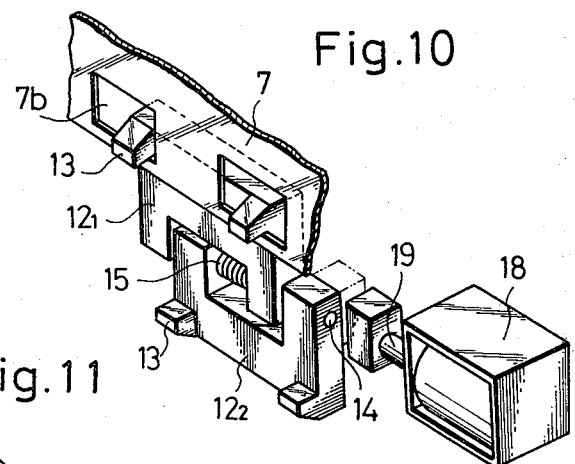
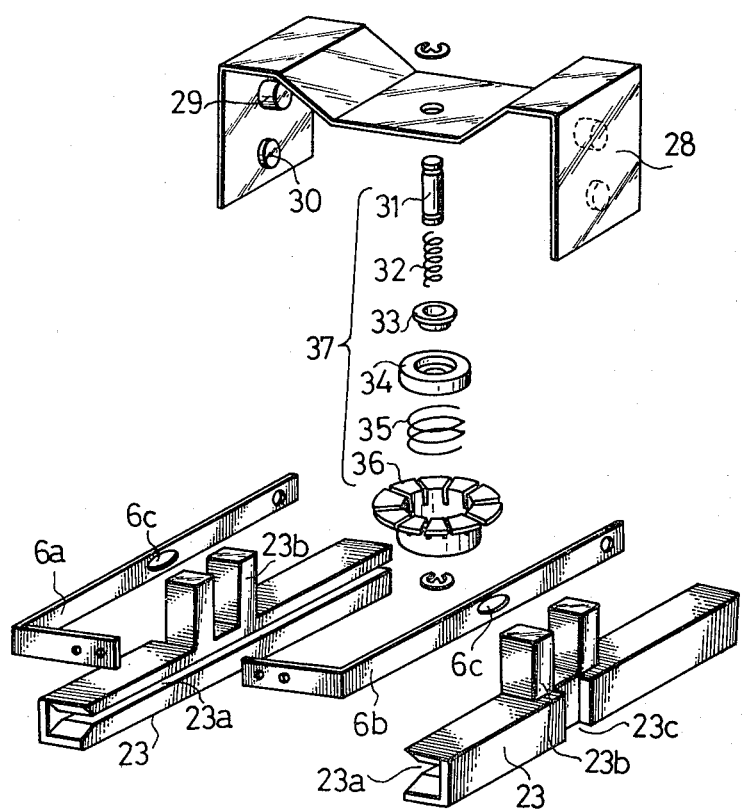

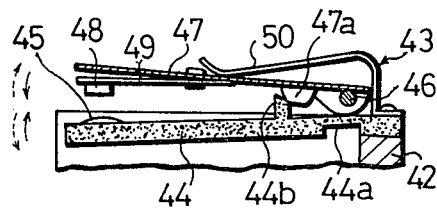
Fig.14 (A)
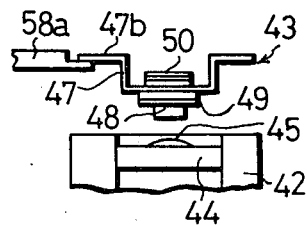
Fig.14 (A')
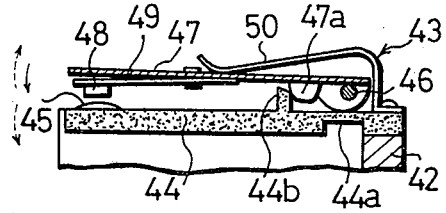
Fig.14 (B)
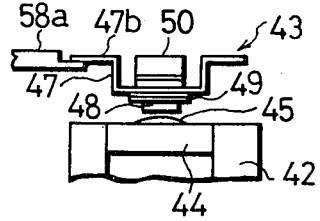
Fig.14 (B')
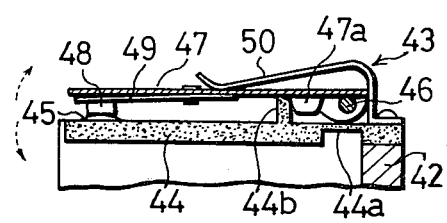
Fig.14 (C)
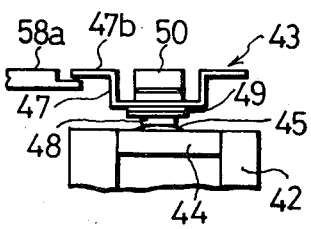
Fig.14 (C')
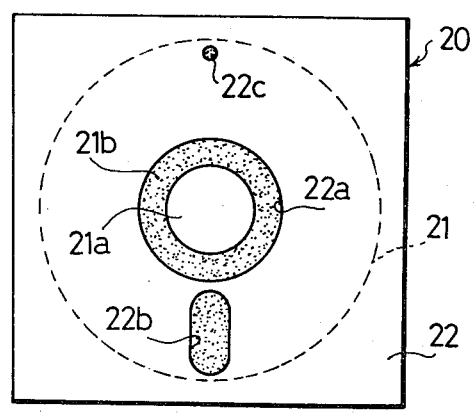
Fig.15

FLEXIBLE DISK DRIVE

BACKGROUND OF THE INVENTION

The present invention relates to a drive apparatus for a flexible record carrier, in particular, for a magnetic disc enveloped in a flat envelope having a central hole through which a central portion of the disc is accessible for driving engagement during operation.

Such an apparatus includes a frame having an entrance opening adapted for receiving an enveloped disc, a pivoted cover having a front and a rear side and arranged on the frame for movement between an open and a closed position, a turntable rotatable about an axis of rotation, a first stationary member forming a portion of the frame located at the clamping member side of the disc, a second stationary member, for locating the turntable, and forming a portion of the frame located at the turntable side of the disc, a guide spindle mounted in the first member and being coaxial with the turntable, a rotatable clamping member movably mounted on the spindle for axial movement therealong, and linking means for moving the clamping member toward and away from the turntable. The linking means is arranged between the cover and the clamping member to cause a received disc to be clamped between the clamping member and the turntable when the cover is closed and to be unclamped when the cover is open.

From U.S. Pat. No. 4,216,510 a drive apparatus is known in which the cover together with a roller and clamping-lever linking mechanism as well as with the lifting part of the drive mechanism including its spindle constitute an interchangeable assembly connected to the rest of the apparatus as a unit. The pivotal axis of the cover is situated at the upper edge so that, after opening, the cover projects completely from the drive apparatus and impedes the insertion and removal of the flexible record carrier. Furthermore, the roller connected to the cover is arranged so that, in any operating position of the cover, it is positioned on the upward slope of the clamping lever and is moved only slightly on said slope. In order to ensure that the record carrier is correctly centered and is firmly positioned in the drive mechanism, the lifting part of the drive mechanism is formed as a cone and is urged against the stationary part by a compression spring compressed by the clamping lever. Because this spring force is comparatively great, the clamping lever must also exert a comparatively great force on said spring. As a result of this, a continuously increasing pressure must be exerted on said cover when it is to be closed. Therefore, the cover must be of very stable construction. Moreover, such a drive apparatus cannot be incorporated in light-weight equipment because this equipment would slide away when the cover was closed if no counteracting force were exerted on the equipment. Furthermore, because of the separation between the spindles of the two parts of the drive apparatus, it is not unlikely that these spindles will not be in line (not precisely coaxial) owing to manufacturing tolerances or wear effects. This non-coaxiality may impair the correct retention of the flexible record carrier.

Furthermore, a drive apparatus is known from U.S. Pat. No. 3,940,793, in which the cover comprises a lever with a downwardly curved slope which, upon actuation of the cover, runs between two rollers of the clamping lever and then pivots said lever about a pivotal axis. This known drive apparatus is very intricate. The cover as well as its lever cannot be made comparatively thin and thus cannot be manufactured in a simple manner, because, although the clamping lever does not act on a compression spring, the total pressure for clamping the record carrier in the drive mechanism is produced by the lever of the cover. Thus, the force required for closing the cover will also steadily increase with this construction.

SUMMARY OF THE INVENTION

It is the object of the invention to provide a drive apparatus whose cover can be actuated with a constant and small force without complicating the construction. Moreover, the drive elements and the clamping cone should be easy to mount in order to guarantee that these elements and the cone are correctly journalled on spindles which are in line with each other.

This object is achieved in that both the stationary bearing member for the guide spindle and a stationary fixing member for the bearing housing of the turntable form integral parts of the frame, and in that the bearing housing is introduced into and secured to the frame from the outside. Suitably, the fixing member for the bearing housing forms a bore and the bearing housing is provided with a flange and is secured to an end surface of the bore. This makes it possible to machine the bore for the drive element and a bore for the guide spindle for the clamping cone in one operation into the integral frame.

In accordance with a further embodiment of the invention, the frame has a portion which slopes downwardly toward the exterior over at least a part of the width of the frame at the location of the entrance opening for the record carrier. Similarly, the cover includes a projecting portion (projection) which extends from the cover rear side over at least a part of the width of the cover. Thus, the sloping portion and the projecting extending from its rear side portion constitute a funnel for the insertion of the record carrier in the open position of the cover. This facilitates insertion of the record carrier which is automatically guided in the space between the turntable and the clamping cone.

In accordance with another embodiment of the invention, the linking means includes both an engaging surface provided on the projection and a lever pivotally mounted to the frame about a pivoting axis. The lever includes a slightly curved extension having a curved surface for contact by the engaging surface so that, upon actuation of the cover, the cover is force-coupled to the lever for moving the clamping cone. Specifically, the curved surface of the lever is contacted by the engaging surface at a point spaced a leverage distance from the lever pivoting axis. The cover, its projection and the lever are arranged such that the leverage distance increases from a minimum to a maximum as the cover moves from the open to the closed position.

Preferably, the engaging surface is the surface of a roller rotatably mounted on the projection. The roller engages with and rolls over the slightly curved extension upon acitivation of the cover.

Because the roller rolls over the extension as the cover is closed, the lever arm relative to the level pivoting axis is continuously extended and the point of contact between the roller and the extension is shifted so relative to the pivotal axis of the cover that, as the entrance opening is further closed, the required force remains substantially constant or increases only to an insignificant extent.

BRIEF DESCRIPTION OF THE DRAWINGS

The invention will be now described in more detail with reference to the accompanying drawing in which.

BRIEF DESCRIPTION OF THE PREFERRED EMBODIMENTS

Figure 1:
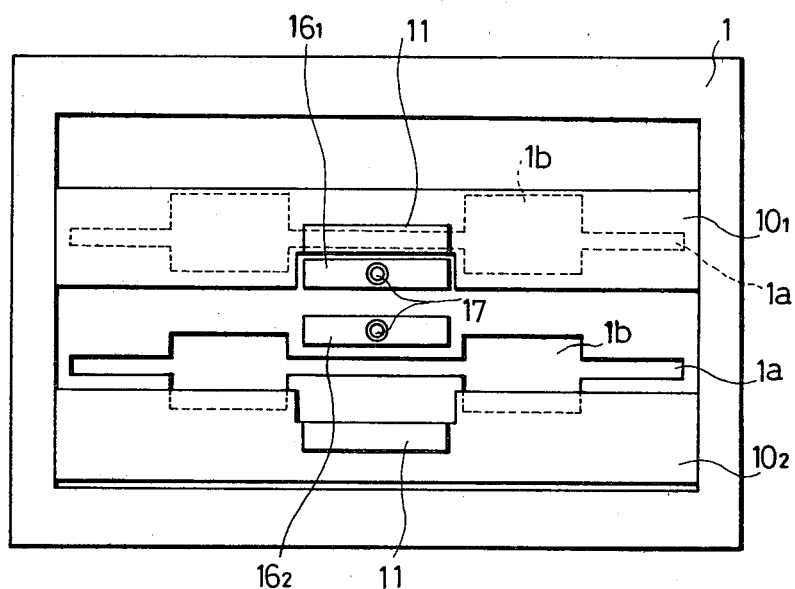
FIG. 1 is a perspective view of a drive apparatus according to the invention having its cover open and a record carrier arranged in front of the opened cover.
Figure 2:
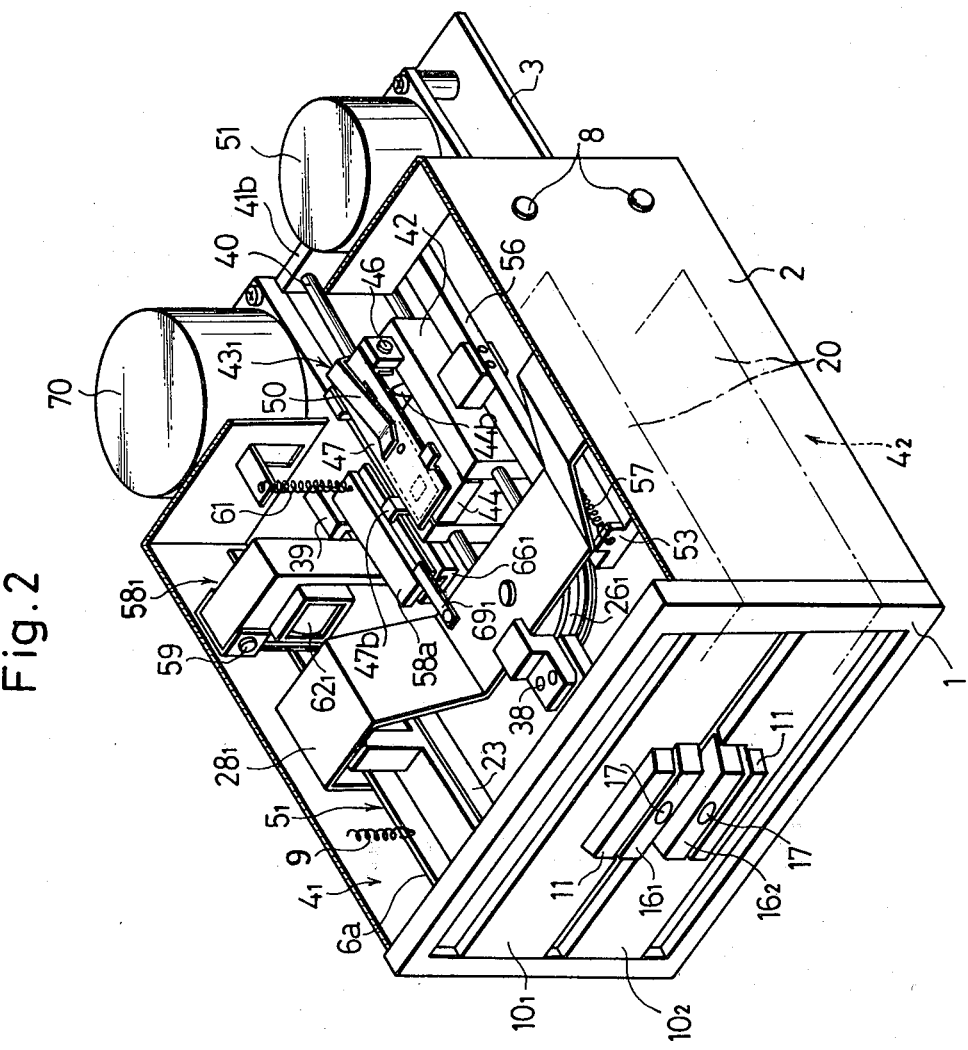
FIG. 2 is an exploded perspective view of the drive apparatus.
Figure 3:
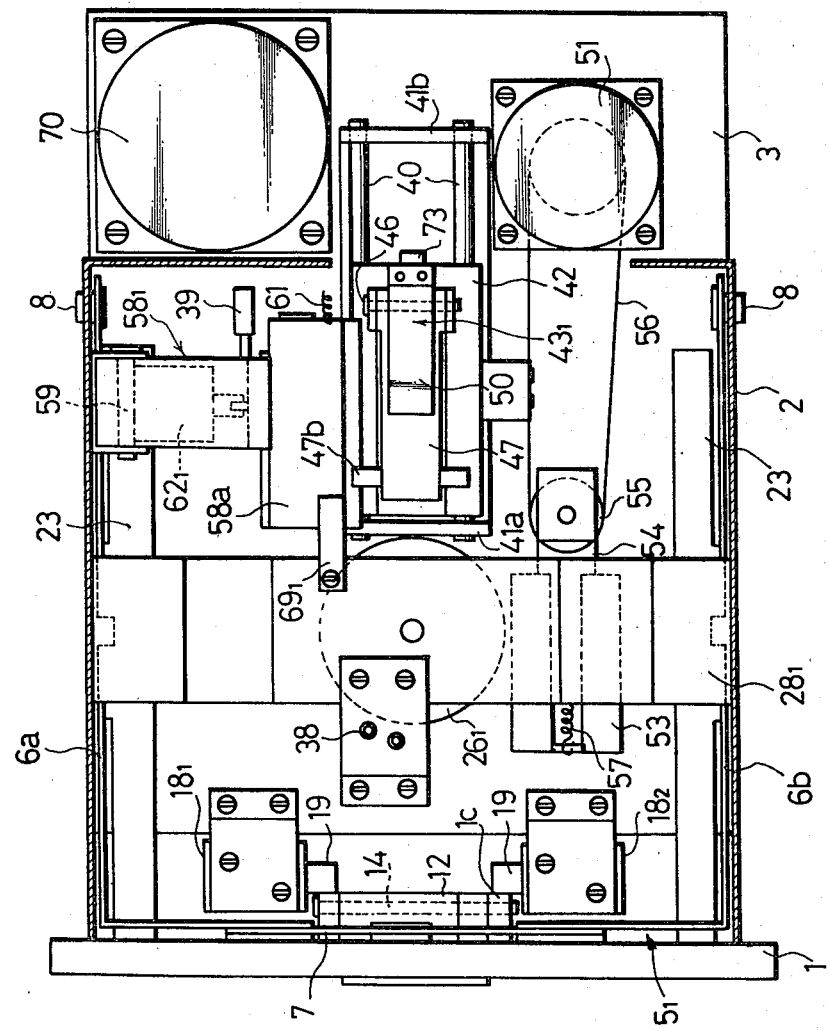
FIG. 3 is a partial sectional view of the drive apparatus.

The drive mechanism (means) for driving a flexible record carrier (having a magnetic disc 10 surrounded by an enclosure or envelope 18) is mounted in a frame 25 formed, for example, by die-casting. The stationary members 23, 29 and the frame 25 are casted together to form a unitary part. The drive mechanism comprises a driven part. The drive mechanism comprises a driven part and a lifting part as shown in FIG. 3 which shows the mechanism only on one side of the axis of symmetry. The lifting part is constructed as a centering or clamping cone 9. The driven part comprises a turntable 11 and a bearing housing 24 with a drive pulley 27. The driven part is driven in known manner by an electric motor via a belt. The bearing housing 24 comprises a circumferential flange 26 which cooperates with the member 23 for locating or fitting the bearing housing exactly in a bore formed by the stationary fixing member 23. By means of lugs 28, the bearing housing is detachably mounted on 23. The inner face of the bore is ultimately formed in the integral frame 25 by a milling operation such that the axis of the bore is in line (precisely coaxial) with the axis of a guide spindle 17 for the clamping cone 9. This is achieved effectively if the fixing member bore and a precise bore formed by the stationary member 29 for mounting the guide spindle 17 have their respective inner faces machined to final dimensions in one operation into the integral frame. The member 29 is connected to the remainder of the frame by a rigid part 1 protruding from and integral with the remainder of the frame.

The outer diameters of the turntable 11 and the clamping cone 9 are smaller than the bore diameter so that the entire driven part, after its assembly, and the clamping cone 9, after mounting of the guide spindle 17, can be inserted into the frame 25 through the fixed member 23 from underneath and can be secured therein.

The clamping cone 9 comprises a sleeve 20 by means of which the cone can be slid up and down the guide spindle 17. This sliding movement is obtained by means of the fork-shaped construction of the front end of a clamping lever 7. In the operating position of said lever 7, shown in FIG. 3, pressure is exerted on a compression spring 8 surrounding the sleeve 20. The spring in turn urges the clamping cone 9 into the turntable 11 of the drive mechanism and thereby centers and clamps the flexible disk 10 in the drive mechanism. In this position of the clamping lever 7, a return spring 14 is tensioned. The spring 14 is secured to the clamping lever 7 and to the frame 25. Before the cover 2 is fitted, the clamping lever 7 is mounted through the entrance opening of the apparatus. The lever is inserted through the opening until its fork-shaped leading end 30 engages the sleeve 20 between an abutment 22 on the sleeve and the upper end of the compression spring 8. Subsequently, a bearing spindle 15 is laterally inserted into a corresponding seating in the frame. The clamping lever 7 is pivotal about the pivoting axis of said bearing spindle 15 by actuation of the cover.

When the cover 2 is pivoted about its pivotal axis 3 into the position represented by broken lines in FIG. 3, the clamping lever 7 is released. This lever yields to the pressure of the spring 8 until the fork-shaped end 30 engages with the abutment 22. Subsequently, the return spring 14 pivots said lever, together with the sleeve 20 and the clamping cone 9, into the position which is only partly represented by broken lines. Thus, the cone 9 is coaxially spaced from the turntable 11.

Figure 4:
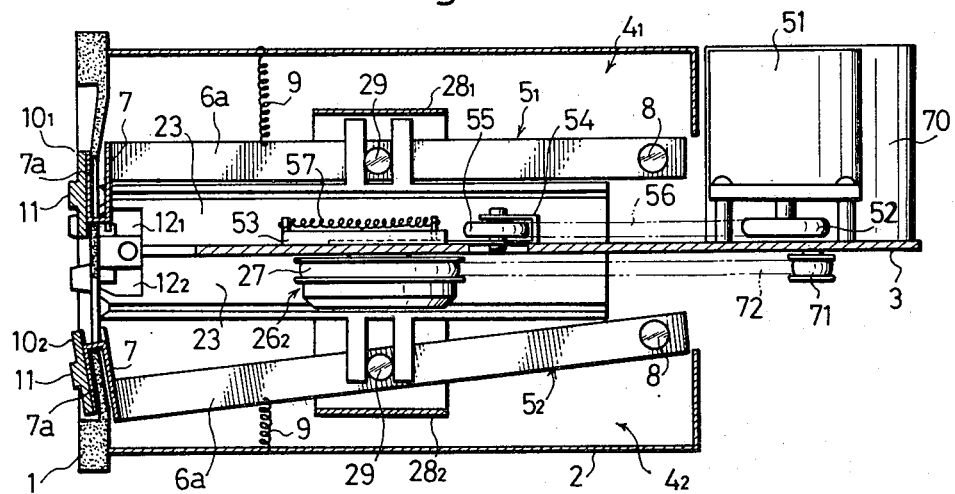
FIG. 4 is a perspective view of the rear side of the cover.
Figure 5:
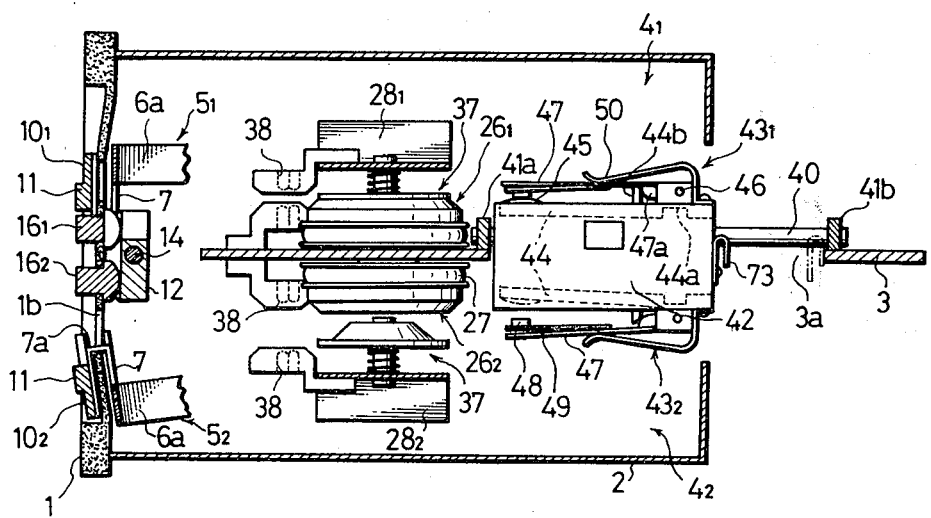
Figure 6:
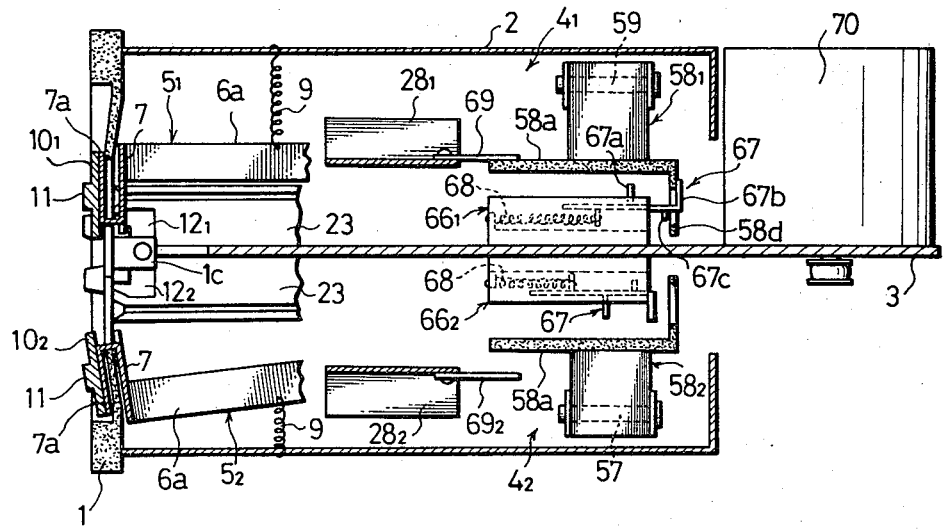
Figure 7:
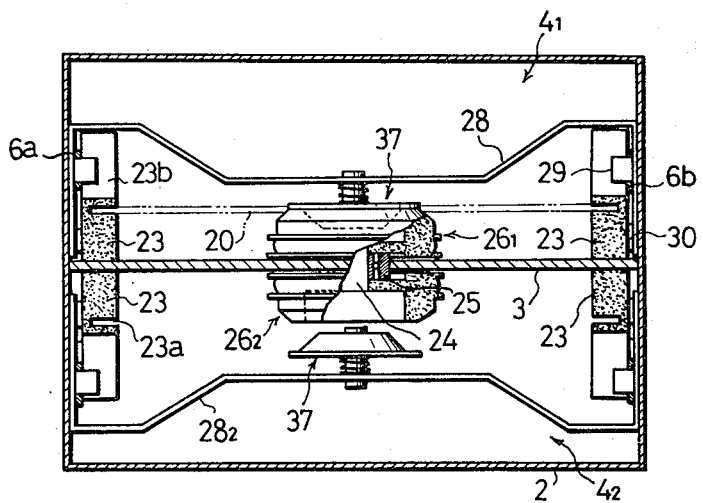
Figure 8:
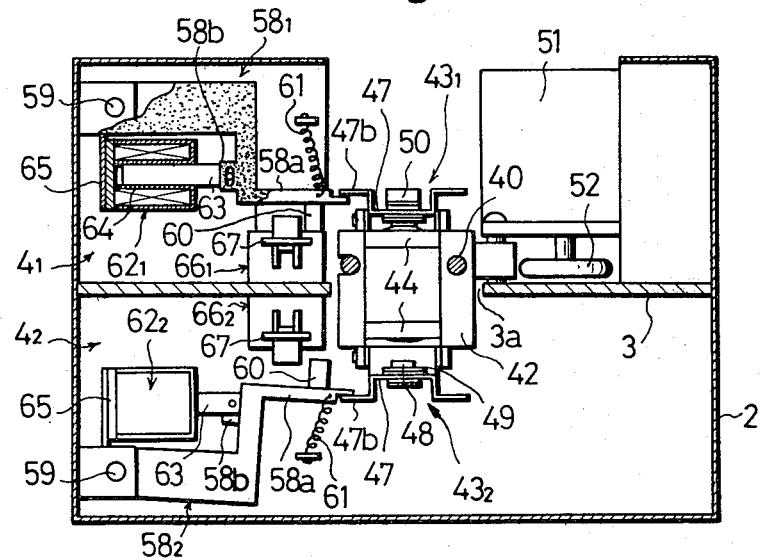
Figure 9:
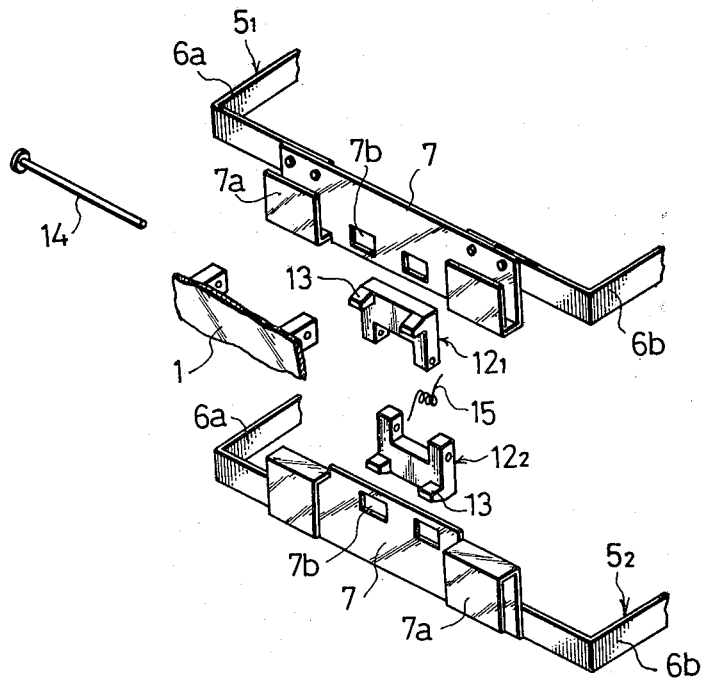
Figure 12:
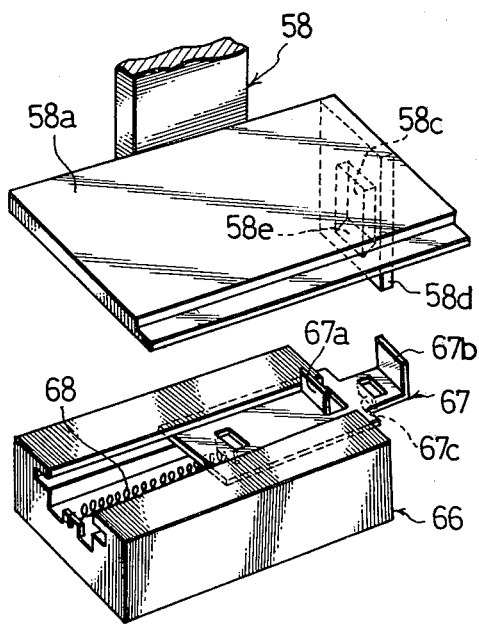
Figure 13:
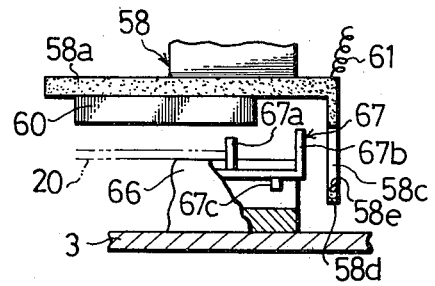
Figure 13:
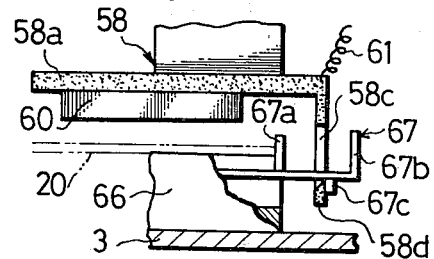
Figure 13:
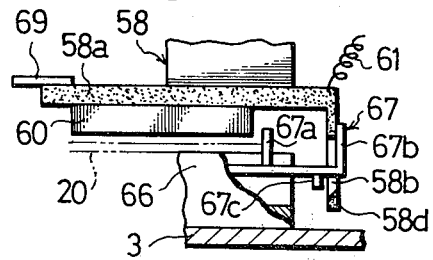
Figure 13:
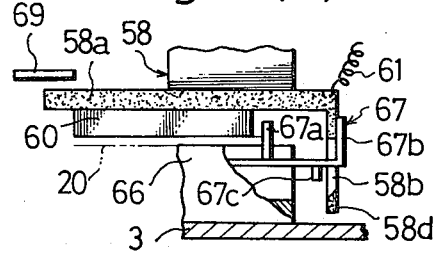
Figure 1:
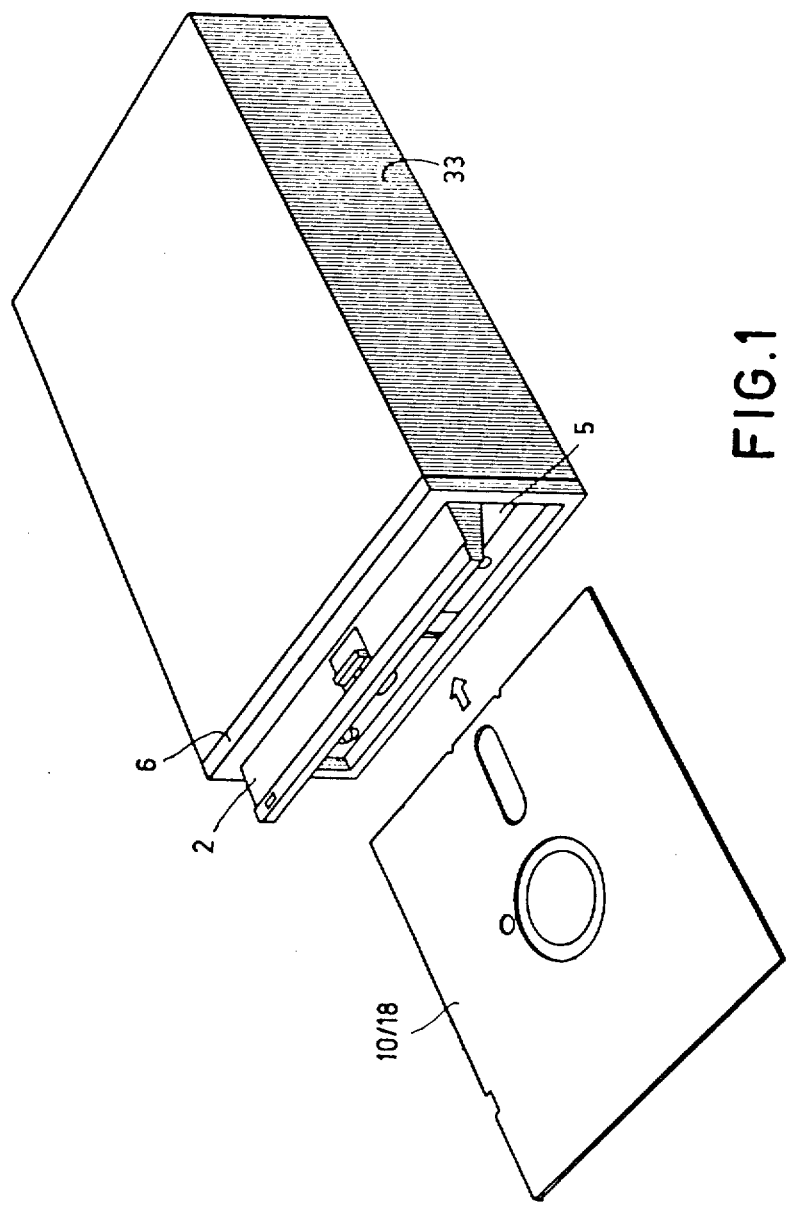
Figure 2:
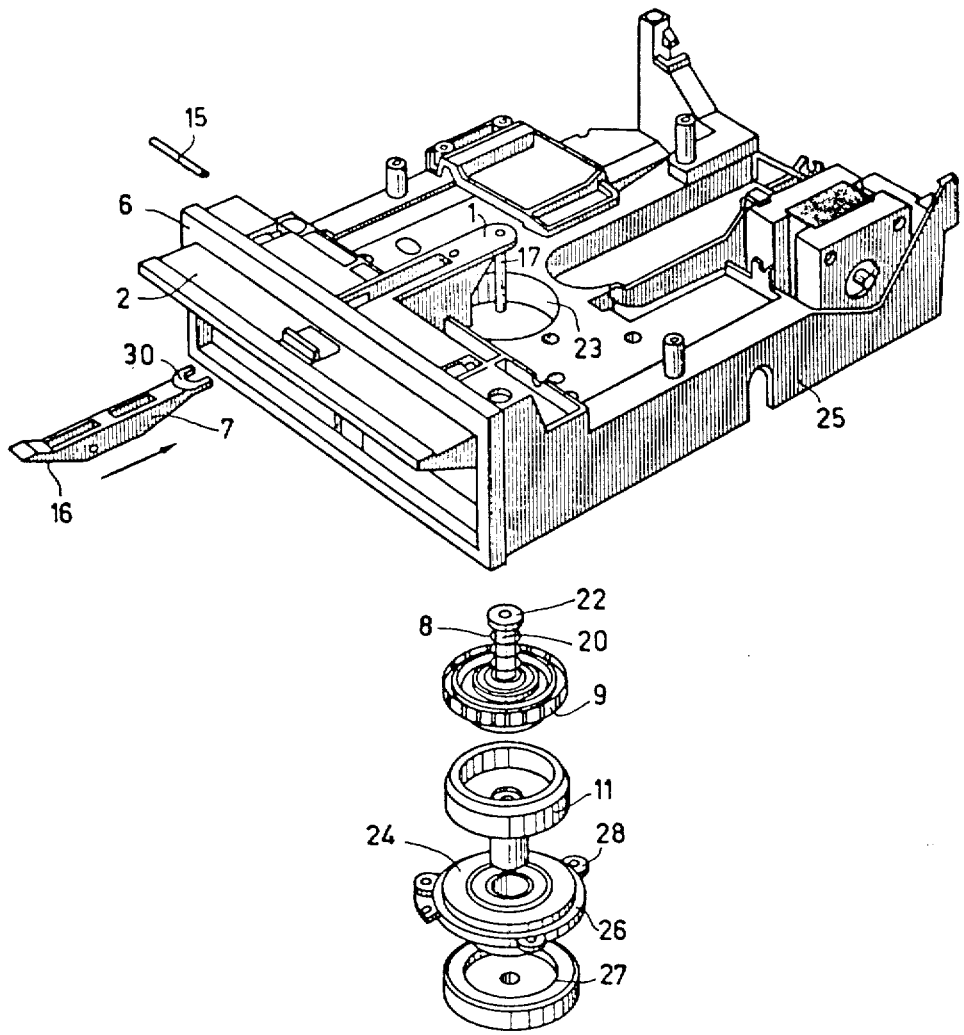
Figure 3:
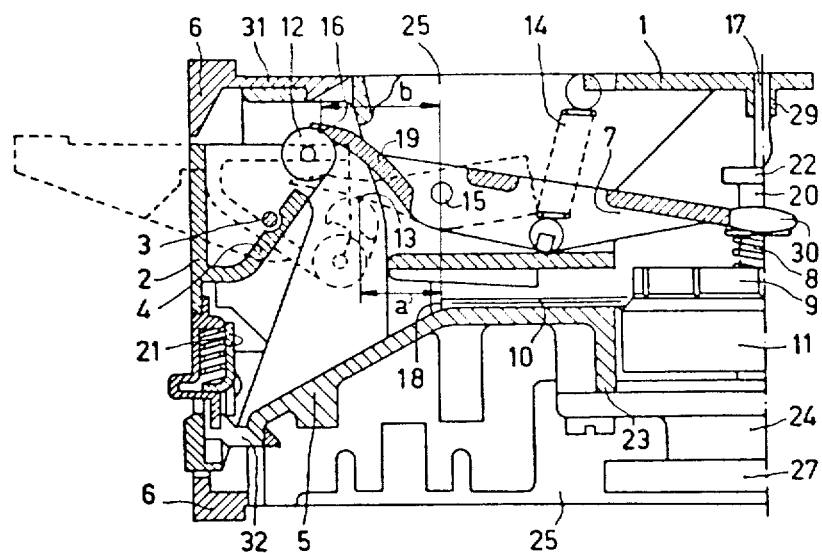
Figure 4:
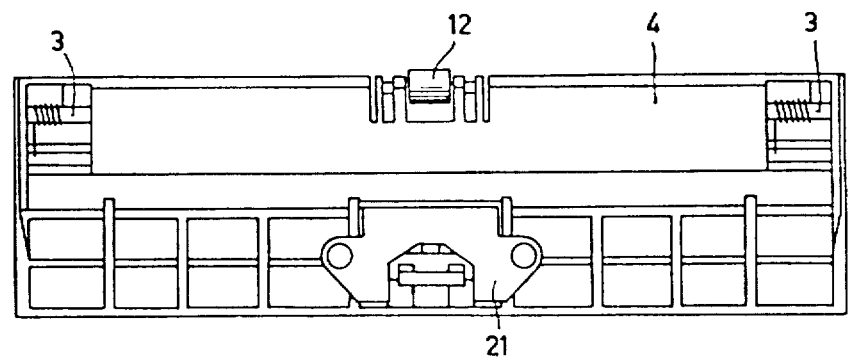

A new record carrier 10, 18 can be inserted into the apparatus without risk owing to the presence of two inclined projecting portions 4, 5 which provides no impediments to the record carrier 10, 18 automatically guided by the funnel-shaped opening thus formed. As can be seen in FIG. 4, which is a view of the cover 2 from the interior of the frame, the inclined projecting portion 4 extends substantially over the full width of the cover 2.

If the cover 2 is now pivoted from the open to the closed position about its pivotal axis 3, this is initially effected without any counteracting force until the roller 12 of the cover engages the curved extension 19 of the clamping lever 7 at a contact point 13 on the extension 19. The leverage distance a of this point spaced from the bearing spindle 15 of the clamping lever 7 is minimal. As the cover 2 is pivoted further, the clamping lever 7 is pivoted about the bearing spindle 15. At the cover 2, only the comparatively small spring force of the return spring 14 has to be overcome.

Upon a further pivotal movement, the clamping lever 7 contacts the compression spring 8 whose spring force is greater than that of the return spring 14 so that from this point a greater force would be required to actuate the cover if in the meantime the point of contact between the roller 12 and the clamping lever 7 had not moved further away from the pivot of the clamping lever 7. As a result of this, the lever arm is extended, so that with the same force exerted on the cover, a greater spring force can be overcome. The lever arm is extended until finally the contact point 16 is reached. The point 16 is situated at a leverage distance b from the pivoting axis of the clamping lever. In this position, the cover 2 is closed and can be latched by means of the latching device 21. In the present example, the increase from the distance a to the maximum distance b is approximately 1.5 to 2 times and can readily be adapted to specific conditions by means of the springs 8 and 14. This ratio of forces becomes even more favorable because the distance between the pivotal axis 3 and the moving point of contact between the roller 12 and the clamping lever 7 remains substantially constant during the pivotal movement of the cover 2. For this purpose, the extension 19 of the clamping lever 7 is slightly curved.

Because the pivotal axis 3 of the cover 2 is situated well inside the housing, the cover will not project far from the housing in the open position. Accordingly, the ejected record carrier 10 can readily be gripped.

A plastics front plate 6 can be snapped onto the frame 25 by means of clips 31 and 32. Thus, when the drive apparatus is to be incorporated in a housing 33, the front plate 6 can be adapted to openings of any size. Moreover, the cover 2 comprises a latching device 21, known per se, with which it engages behind a projecting portion of the front plate 6 in the closed position. The cover can then be unlatched by moving said latching device 21.

While there has been shown and described what is at present considered the preferred embodiments of the flexible disc drive according to the invention, it will be obvious to those skilled in the art that various changes and modifications may be made therein without departing from the spirit and scope of the invention as defined by the appended claims.

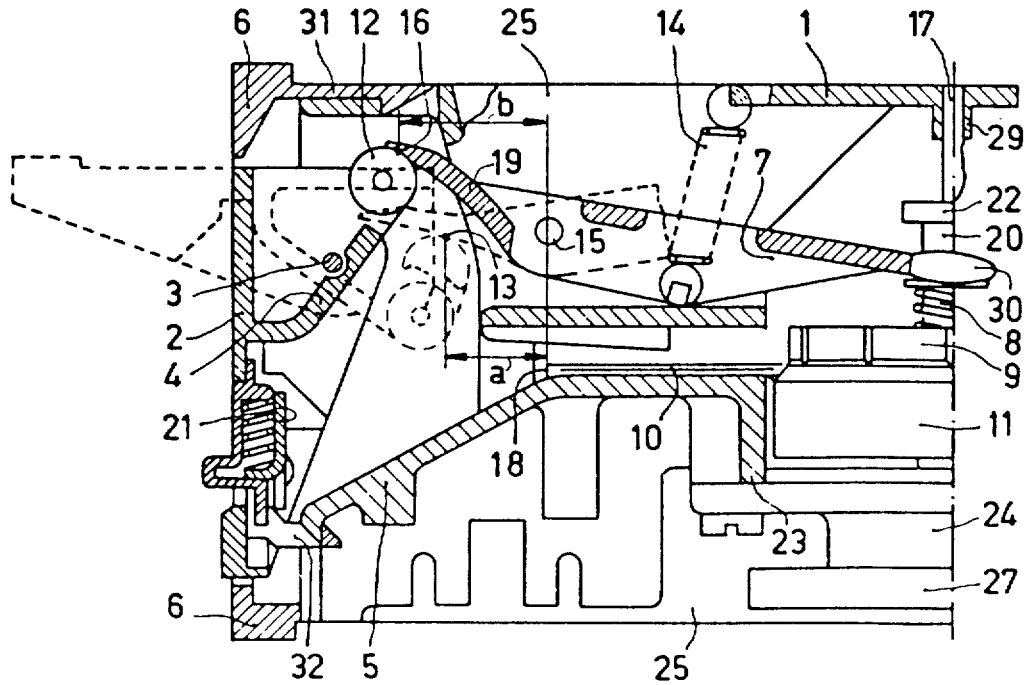

What is claimed is:

1. A drive apparatus for a flexible magnetic disc enveloped in a flat envelope having a central opening through which a central portion of the disc is accessible for driving engagement during operation, the apparatus comprising:
   a frame having an entrance opening adapted for receiving an enveloped disc inserted therethrough;
   a pivoted cover having a front and a rear side, and arranged on the frame for movement between an open position and a closed position at which the opening is covered, the cover having a projection extending from the rear side;
   means, associated with the frame, for driving the disc, the driving means including a turntable rotatable about an axis of rotation and a rotatable clamping member coaxially spaced from the turntable;
   a guide spindle mounted in the frame and extending toward the turntable, the clamping member being movably mounted on the spindle for axial movement therealong; and
   linking means, arranged between the cover and the clamping member, for moving the clamping member toward and away from the turntable to cause a received disc to be clamped between the clamping member and the turntable, and to be driven thereby, when the cover, after inserting the enveloped disk through the opening, is in the closed position, and to be unclamped, when the cover is moved into the open position;
   characterized in that the linking means includes an engaging surface provided on the projection, and a lever, the lever being pivotally mounted to the frame about a pivoting axis and having means for engaging the clamping member to move it axially along the spindle, and the lever also having a surface for contact by the engaging surface at a point spaced a leverage distance from the pivoting axis, and the cover, the projection and the lever being arranged such that the leverage distance increases from a minimum to a maximum as the cover moves from the open position to the closed position.

2. An apparatus as claimed in claim 1, wherein the maximum leverage distance is in a range between approximately 1.5 and 2 times the minimum leverage distance.

3. An apparatus as claimed in claim 1, wherein the engaging surface comprises a surface of a roller rotatably mounted on the projection.

4. An apparatus as claimed in claim 3, wherein the contact surface of the lever is slightly curved.

5. A drive apparatus for a flexible magnetic disc enveloped in a flat envelope having a central opening through which a central portion of the disc is accessible for driving engagement during operation, the apparatus comprising:
   a frame having an entrance opening adapted for receiving an enveloped disc inserted therethrough;
   a pivoted cover having a front and a rear side, and arranged on the frame for movement between an open position and a closed position at which the opening is covered, the cover having a projection extending from the rear side;
   means, mounted within the frame, for driving the disc, the driving means including a turntable rotatable about an axis of rotation and a rotatable clamping member coaxially spaced from the turntable;
   a first stationary member forming a portion of the frame located at the clamping member side of the disc, the first member having a bore therein;
   a guide spindle mounted in the bore and extending toward the turntable, the bore and the spindle being coaxial with the turntable, and the clamping member being movably mounted on the spindle for axial movement therealong;
   linking means, arranged between the cover and the clamping member, for moving the clamping member toward and away from the turntable to cause a received disc to be clamped between the clamping member and the turntable, and to be driven thereby, when the cover, after inserting the enveloped disc through the opening, is in the closed position, and to be unclamped, when the cover is moved into the open position; and
   a second stationary member being coaxial with the first member bore and forming a portion of the frame located at the turntable side of the disc, the second member being adapted for locating the turntable therein,
   characterized in that the first stationary member, the second stationary member and the frame, together, form a unitary part.

6. An apparatus as claimed in claim 5, wherein the unitary part is formed by casting.

7. An apparatus as claimed in claim 5, wherein the second stationary member forms a bore.

8. An apparatus as claimed in claim 7, wherein the clamping member has an outer diameter less than the inner diameter of the second stationary member bore.

9. An apparatus as claimed in claim 7, wherein both the first member and the second member bores are machined to final dimensions in one operation, whereby the bores are precisely mutually coaxial.

10. An apparatus as claimed in claim 5, wherein the second stationary member has an end surface, and the driving means includes a bearing housing coupled to the turntable, the housing having a circumferential flange cooperating with the second stationary member for locating the turntable within the second stationary member, the housing also having at least one lug for mounting the housing to the end surface of the second stationary member.

* * * * *

UNITED STATES PATENT AND TRADEMARK OFFICE
CERTIFICATE OF CORRECTION

PATENT NO. : 4,380,783

DATED : April 19, 1983

INVENTOR(S) : MANFRED ADAMEK

It is certified that error appears in the above—identified patent and that said Letters Patent is hereby corrected as shown below:

CANCEL TITLE PAGE AND FIGS. 1 THROUGH 15 AND SUBSTITUTE THEREFOR THE ATTACHED TITLE PAGE AND FIGS. 1 THROUGH 4.

Signed and Sealed this

Second Day of October 1984

[SEAL]

Attest:

GERALD J. MOSSINGHOFF

Attesting Officer     Commissioner of Patents and Trademarks

United States Patent [19]

Adamek et al.

[11] 4,380,783
[45] Apr. 19, 1983

[54] FLEXIBLE DISK DRIVE

[75] Inventors: Manfred Adamek, Kirchen-Freusburg; Klaus Rinneburger, Wilnsdorf, both of Fed. Rep. of Germany

[73] Assignee: U.S. Philips Corporation, New York, N.Y.

[21] Appl. No.: 247,583

[22] Filed: Mar. 26, 1981

[51] Int. Cl.³ .................. G11B 17/02; G11B 5/82
[52] U.S. Cl. ........................ 360/99; 360/133
[58] Field of Search ............ 360/99, 97, 133, 135

[56] References Cited

U.S. PATENT DOCUMENTS

| | | | |
|---|---|---|---|
| 3,593,327 | 7/1971 | Shill | 360/97 |
| 3,815,150 | 6/1974 | Stoddard et al. | 360/99 |
| 3,940,793 | 2/1976 | Bleiman | 360/99 |
| 4,146,912 | 3/1979 | Kukreja | 360/99 |
| 4,205,355 | 5/1980 | Hamanaka et al. | 360/99 |
| 4,216,510 | 8/1980 | Manzke et al. | 360/97 |

*Primary Examiner*—Alfred H. Eddleman
*Attorney, Agent, or Firm*—Joseph P. Abate

[57] ABSTRACT

A disc drive for a flexible magnetic disc includes a frame, a pivoted cover, a turntable spaced from a spindle-mounted disc clamping cone, and a lever for cooperating with the cone to move it toward and away from the turntable. The lever is mounted on the frame about a pivoting axis. As the cover is closed, a cover mounted roller contacts the lever at a point spaced a distance from the lever pivoting axis. This distance continuously increases until the disc is clamped for operation.

The stationary members for the spindle and the turntable are a unitary part with the frame. The members are machined to their final dimensions in one operation.

10 Claims, 4 Drawing Figures